(12) United States Patent
Huang et al.

(10) Patent No.: US 12,512,855 B2
(45) Date of Patent: Dec. 30, 2025

(54) FORWARD ERROR CORRECTION SYNCHRONIZATION METHOD AND FORWARD ERROR CORRECTION SYNCHRONIZATION SYSTEM CAPABLE OF RECOVERING SYNCHRONIZATION OF FORWARD ERROR CORRECTION BLOCKS

(71) Applicant: MEDIATEK INC., Hsin-Chu (TW)

(72) Inventors: Jia-Hong Huang, Hsinchu (TW);
Po-Hung Liu, Hsinchu (TW);
Chang-Chen Chu, Hsinchu (TW);
Ting-Wei Lai, Hsinchu (TW);
Tzu-Ying Tung, Hsinchu (TW);
Yu-Shen Chou, Hsinchu (TW);
Tzu-Hsuan Huang, Hsinchu (TW);
Ko-Yin Lai, Hsinchu (TW);
Chih-Kang Hsu, Hsinchu (TW);
Tai-Lai Tung, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/642,726

(22) Filed: Apr. 22, 2024

(65) Prior Publication Data

US 2025/0330202 A1    Oct. 23, 2025

(51) Int. Cl.
H03M 13/33    (2006.01)
H04L 1/00    (2006.01)
H04L 7/02    (2006.01)

(52) U.S. Cl.
CPC ........ *H03M 13/333* (2013.01); *H04L 1/0042* (2013.01); *H04L 7/02* (2013.01)

(58) Field of Classification Search
CPC ....... H03M 13/333; H04L 1/0042; H04L 7/02
See application file for complete search history.

(56) References Cited

U.S. PATENT DOCUMENTS

| 2015/0319464 | A1* | 11/2015 | Hellge | H04N 19/89 375/240.27 |
| 2016/0373198 | A1* | 12/2016 | Natsukawa | H04L 69/03 |
| 2017/0287102 | A1* | 10/2017 | Anantharaman | G09G 5/006 |

* cited by examiner

*Primary Examiner* — Thien Nguyen
(74) *Attorney, Agent, or Firm* — Winston Hsu

(57) ABSTRACT

A forward error correction (FEC) synchronization method includes establishing a link between a source terminal and a sink terminal, transmitting a tagged symbol periodically from the source terminal to the sink terminal, identifying the tagged symbol by the sink terminal after the tagged symbol is received by the sink terminal, collecting a plurality of symbols transmitted from the source terminal for generating a plurality of FEC blocks received by the sink terminal after the tagged symbol is successfully identified, and synchronizing the plurality of FEC blocks between the source terminal and the sink terminal according to the tagged symbol. The tagged symbol includes predefined patterns.

18 Claims, 3 Drawing Sheets

FORWARD ERROR CORRECTION SYNCHRONIZATION METHOD AND FORWARD ERROR CORRECTION SYNCHRONIZATION SYSTEM CAPABLE OF RECOVERING SYNCHRONIZATION OF FORWARD ERROR CORRECTION BLOCKS

BACKGROUND

The forward error correction (FEC) technology is a mechanism for recovering error packets on a link by sending additional parity symbols padding to the packets. In other words, FEC codes can be regarded as special code words for detecting errors and correcting errors. With the redundancy information sent from a transmitter, the receiver is able to detect certain errors from the received data. Since the FEC technology can resist errors and improve robustness of signal communications, the FEC technology is popularly applied for correcting corrupted data in various high-speed multi-media communications.

However, when an FEC enable sequence is undetected by a sink terminal (viewed as a receiver) due to numerous bit errors or severe channel interferences, although the sink terminal can maintain symbol synchronization, it may fail in the synchronization of FEC blocks because it does not know when the source (viewed as a transmitter) starts sending data with FEC enabled.

Therefore, developing an FEC synchronization system capable of recovering the synchronization of FEC blocks for the high-speed multi-media communications is an important design issue.

SUMMARY

In an embodiment of the present invention, a forward error correction (FEC) synchronization method is disclosed. The FEC synchronization method comprises establishing a link between a source terminal and a sink terminal, transmitting a tagged symbol periodically from the source terminal to the sink terminal, identifying the tagged symbol by the sink terminal after the tagged symbol is received by the sink terminal, collecting a plurality of symbols transmitted from the source terminal for generating a plurality of FEC blocks received by the sink terminal after the tagged symbol is successfully identified, and synchronizing the plurality of FEC blocks between the source terminal and the sink terminal according to the tagged symbol. The tagged symbol comprises predefined patterns.

In another embodiment of the present invention, a forward error correction (FEC) synchronization system is disclosed. The FEC synchronization system comprises a source terminal and a sink terminal linked to the source terminal. The source terminal comprises an 8b/10b encoder and an FEC encoder coupled to the 8b/10$_b$ encoder. The sink terminal comprises a 10b/8b decoder and an FEC decoder coupled to the 10b/8b decoder. After a link between the source terminal and the sink terminal is established, the source terminal periodically transmits a tagged symbol to the sink terminal. The sink terminal identifies the tagged symbol after the tagged symbol is received by the sink terminal. The sink terminal collects a plurality of symbols transmitted from the source terminal for generating a plurality of FEC blocks received by the sink terminal after the tagged symbol is successfully identified. The plurality of FEC blocks between the source terminal and the sink terminal are synchronized by the sink terminal according to the tagged symbol. The tagged symbol comprises predefined patterns.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
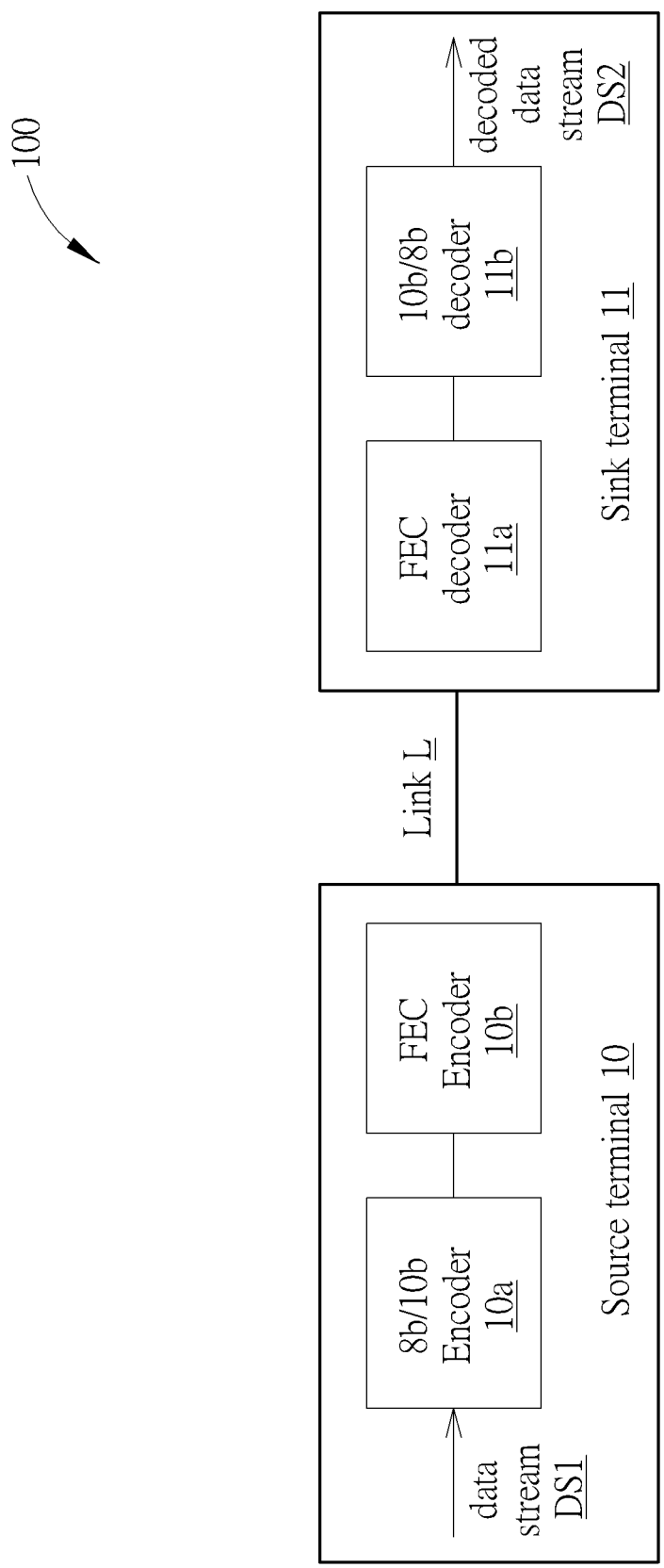
FIG. 1 is a block diagram of a forward error correction (FEC) synchronization system according to an embodiment of the present invention.

FIG. 1 is a block diagram of a forward error correction (FEC) synchronization system 100 according to an embodiment of the present invention. The FEC synchronization system 100 includes a source terminal 10 and a sink terminal 11. The sink terminal 11 is linked to the source terminal 10. The source terminal 10 can be regarded a data transmitter, such as a graphics card. The sink terminal 11 can be regarded as a data receiver, such as a display device or a monitor. To perform high-speed data communications between the source terminal 10 and the sink terminal 11, the source terminal 10 can start a link training stage under a suitable link rate and an appropriate lane count. The sink terminal 11 can be trained for performing a clock recovery, channel equalization, and symbol lock functions (i.e., M symbol bits alignment). Therefore, the link L between the source terminal 10 and the sink terminal 11 can correspond to a high-speed media channel link. The source terminal 10 includes an 8b/10b encoder 10a and an FEC encoder 10b. The FEC encoder 10b is coupled to the 8b/10b encoder 10a. Here, the 8b/10b encoder 10a is used for encoding 8-bit data segments of a data stream DS1 as 10-bit symbols for achieving direct current (DC) balance and bounded disparity. The FEC encoder 10b can be used for performing a linear encoding mechanism of a group of symbols by using a generating matrix with parity information. The FEC encoder 10b can output a plurality of FEC blocks. However, the FEC synchronization system 100 is not limited to the 8b/10b encoder 10a and specific sizes of the FEC blocks. For example, each FEC block can include N symbols. Each symbol can include M symbol bits. N and M are positive integers. Further, the sink terminal 11 can include a 10b/8b decoder 11b and an FEC decoder 11a. The FEC decoder 11a is coupled to the 10b/8b decoder 11b. The FEC decoder 11a can be used for decoding each FEC block. The 10b/8b decoder 11b can be used for decoding each symbol encoded by the 8b/10b encoder 10a to generate a decoded data stream DS2. In the FEC synchronization system 100, after the link L between the source terminal 10 and the sink terminal 11 is established, the source terminal 10 can periodically transmit a tagged symbol to the sink terminal 11. The sink terminal 11 can identify the tagged symbol after the tagged symbol is received by the sink terminal 11. Then, the sink terminal 11 can collect a plurality of symbols transmitted from the source terminal 10 for generating a plurality of FEC blocks received by the sink terminal 11 after the tagged symbol is successfully identified. Here, the plurality of FEC blocks can be synchronized between the source terminal 10 and the sink terminal 11 according to the tagged symbol. The tagged symbol can include predefined patterns. Details of performing the FEC block synchronization by the FEC synchronization system 100 are illustrated below.

Figure 2:
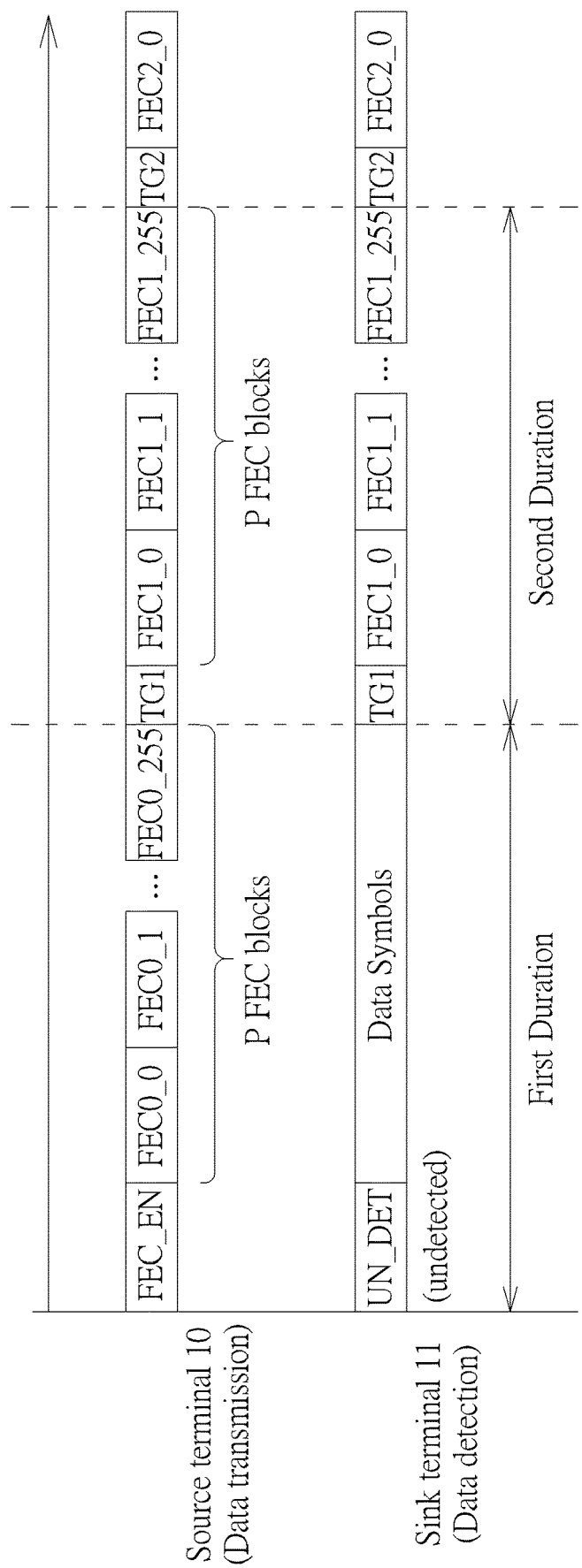
FIG. 2 is an illustration of data communications between a source terminal and a sink terminal of the FEC synchronization system in FIG. 1.

FIG. 2 is an illustration of data communications between the source terminal 10 and the sink terminal 11 of the FEC synchronization system 100. In FIG. 2, x-axis denotes as a timeline. After the FEC encoder 10b of the source terminal 10 is enabled, the source terminal 10 can transmit an FEC enable sequence FEC_EN to the sink terminal 11. Then, the source terminal 10 can transmit P FEC blocks (such as FEC blocks FEC0_0 to FEC0_255) to the sink terminal 10 after the FEC enable sequence FEC_EN is generated. P can be a positive integer, such as 256 or 512. In FIG. 2, the sink terminal 11 can receive a plurality of symbols transmitted from the source terminal 10 and then determine if the received symbols can be detected as the FEC enable sequence FEC_EN. For example, in FIG. 2, a sequence UN_DET formed by received symbols cannot be identified as the FEC enable sequence FEC_EN due to numerous bit errors or severe channel interferences. Therefore, since the FEC enable sequence FEC_EN cannot be detected or identified by the sink terminal 11, the synchronization of the P FEC blocks in a first duration fails. In other words, although the FEC block FEC0_0 to the FEC block FEC0_255 are transmitted from the source terminal 10 to the sink terminal 11, since the FEC enable sequence FEC_EN cannot be detected or identified by the sink terminal 11, the FEC decoder 11a of the sink terminal 11 is not enabled. As a result, the sink terminal 11 processes the FEC block FEC0_0 to the FEC block FEC0_255 as "data symbols". It can be understood that the source terminal 10 can transmit the plurality of symbols to the sink terminal 11. The sink terminal 11 can still align the M symbol bits of each symbol for synchronizing the plurality of symbols received by the sink terminal 11. However, since the sink terminal 11 processes the FEC block FEC0_0 to the FEC block FEC0_255 as "data symbols", the FEC block FEC0_0 to the FEC block FEC0_255 cannot be decoded by the FEC decoder 11a in the first duration.

After the source terminal 10 generates P FEC blocks FEC0_0 to FEC0_255 during the first duration, the source terminal 10 can generate the tagged symbol TG1. Thus, in a beginning time point of a second duration, the source terminal 10 can transmit the tagged symbol TG1 to the sink terminal 11. Then, the source terminal 10 can transmit P FEC blocks FEC1_0 to FEC1_255 to the sink terminal 11 after the tagged symbol TG1 is transmitted from the source terminal 10 to the sink terminal 11. As previously mentioned, the tagged symbol TG1 includes the predefined patterns. Thus, after the sink terminal 11 acquires the predefined patterns, the sink terminal 11 can compare the predefined patterns with the tagged symbol TG1 received by the sink terminal 11 for identifying the tagged symbol TG1. If the tagged symbol TG1 is successfully identified by the sink terminal 11, it implies that a beginning time point of transmitting the P FEC blocks FEC1_0 to FEC1_255 from the source terminal 10 can be aligned by the sink terminal 11. Therefore, although the sink terminal 11 loses the synchronization of the P FEC blocks FEC0_0 to FEC0_255 in the first duration, the sink terminal 11 can "recover" the synchronization of the P FEC blocks FEC1_0 to FEC1_255 in the second duration according to the tagged symbol TG1. After the P FEC blocks FEC1_0 to FEC1_255 are synchronized, the FEC decoder 11a of the sink terminal 11 can be enabled to decode the P FEC blocks FEC1_0 to FEC1_255. Similarly, after the source terminal 10 generates the P FEC blocks FEC1_0 to FEC1_255 during the second duration, the source terminal 10 can generate a tagged symbol TG2. The tagged symbol TG1 and the tagged symbol TG2 can be identical. In other words, the tagged symbol TG1 can be periodically generated. A period of the tagged symbol TG1 can be defined as a transmitting time difference between the tagged symbol TG1 and the tagged symbol TG2, which is equal to a time length of transmitting the P FEC blocks FEC1_0 to FEC1_255. Similarly, if the tagged symbol TG2 is successfully identified by the sink terminal 11, subsequent FEC blocks following the tagged symbol TG2 can also be synchronized by the sink terminal 11.

In the FEC synchronization system 100, any hardware or technology modification falls into the scope of the present invention. For example, when the source terminal 10 terminates the FEC encoder 10b, the source terminal 10 can transmit an FEC disable sequence to the sink terminal 11. Then, the FEC disable sequence can be received by the sink terminal 11. After the FEC disable sequence is received by the sink terminal 11, the sink terminal 11 can disable the FEC decoder 11a to decode the at least one FEC block. Further, the tagged symbol TG1 or TG2 can include FEC parity marker (PM) information. The link L between the source terminal 10 and the sink terminal 11 can be a display Port (DP) link or any high-speed media channel link. The 8b/10b encoder 10a and the 10b/8b decoder 11b can be any pair-wised encoder and decoder for achieving DC balance and bounded disparity. Further, the tagged symbol TG1 or TG2 can be any pre-defined symbol.

Figure 3:
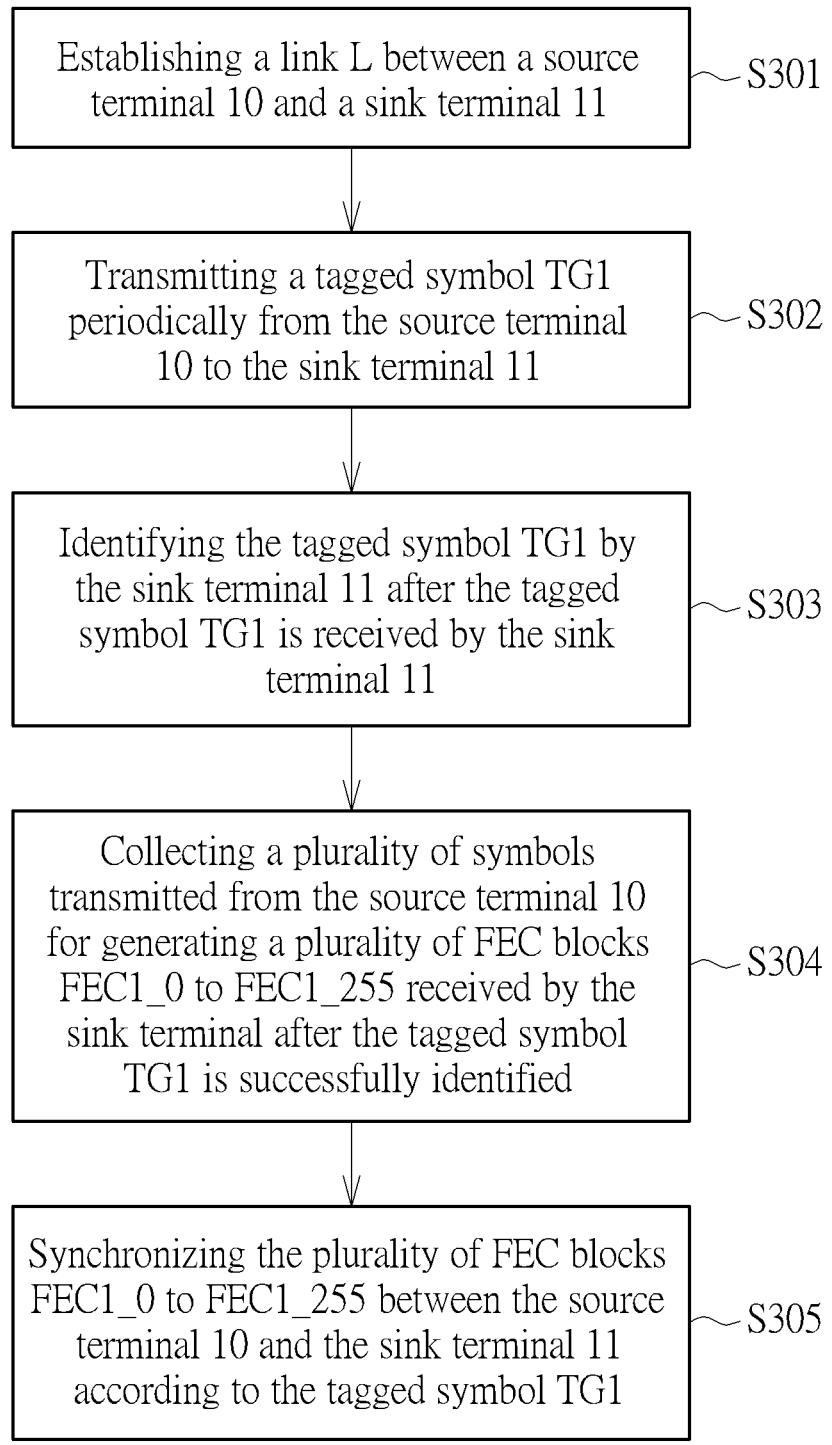
FIG. 3 is a flow chart of performing an FEC synchronization method by the FEC synchronization system in FIG. 1.

FIG. 3 is a flow chart of performing an FEC synchronization method by the FEC synchronization system 100. The FEC synchronization method includes step S301 to step S305. Any technology or hardware modification falls into the scope of the present invention.

step S301: establishing a link L between a source terminal 10 and a sink terminal 11;

step S302: transmitting a tagged symbol TG1 periodically from the source terminal 10 to the sink terminal 11;

step S303: identifying the tagged symbol TG1 by the sink terminal 11 after the tagged symbol TG1 is received by the sink terminal 11;

step S304: collecting a plurality of symbols transmitted from the source terminal 10 for generating a plurality of FEC blocks FEC1_0 to FEC1_255 received by the sink terminal after the tagged symbol TG1 is successfully identified;

step S305: synchronizing the plurality of FEC blocks FEC1_0 to FEC1_255 between the source terminal 10 and the sink terminal 11 according to the tagged symbol TG1.

Details of step S301 to step S305 are previously illustrated. Thus, they are omitted here. In the FEC synchronization system 100, periodic tagged symbols are introduced for synchronizing FEC blocks. Since the transmitting time difference between two tagged symbols is equal to the time length of transmitting P FEC blocks, the tagged symbols can be used for aligning a beginning time point and an ending time point of each period of P FEC blocks. Therefore, although the FEC enable sequence is undetected by the sink terminal 11, the sink terminal 11 can still recover synchronization of the FEC blocks between the source terminal 10 and the sink terminal 11 according to the tagged symbol. As a result, decoding errors or synchronization errors of incoming FEC blocks can be reduced.

To sum up, the present invention discloses an FEC synchronization method and an FEC synchronization system. The FEC synchronization system can use periodic tagged symbols for aligning the beginning time point and the ending time point of each period of the FEC blocks. Therefore, the synchronization of the FEC blocks can be recovered when the FEC enable sequence is undetected by the sink terminal. Since the synchronization of the FEC blocks can be recovered, decoding errors or synchronization errors of incoming FEC blocks can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A forward error correction (FEC) synchronization method comprising:
    establishing a link between a source terminal and a sink terminal;
    transmitting an FEC enable sequence from the source terminal to the sink terminal after an FEC encoder of the source terminal is enabled;
    transmitting a tagged symbol periodically from the source terminal to the sink terminal;
    identifying the tagged symbol by the sink terminal after the tagged symbol is received by the sink terminal;
    collecting a plurality of symbols transmitted from the source terminal after the tagged symbol is successfully identified, wherein the plurality of symbols constitute a plurality of FEC blocks received by the sink terminal; and
    recovering synchronization of the plurality of FEC blocks between the source terminal and the sink terminal according to the tagged symbol when the FEC enable sequence is undetected by the sink terminal;
    wherein the tagged symbol comprises predefined patterns.

2. The method of claim 1, further comprising:
    decoding the plurality of FEC blocks by the sink terminal after the plurality of FEC blocks are synchronized.

3. The method of claim 1, wherein each FEC block comprises N symbols, each symbol comprises M symbol bits, and a period of the tagged symbol is equal to P FEC blocks, N, M, and P are positive integers.

4. The method of claim 3, further comprising:
    transmitting the plurality of symbols from the source terminal to the sink terminal; and
    aligning the M symbol bits of the each symbol by the sink terminal for synchronizing the plurality of symbols received by the sink terminal.

5. The method of claim 3, further comprising:
    transmitting the P FEC blocks from the source terminal to the sink terminal after the tagged symbol is transmitted from the source terminal to the sink terminal.

6. The method of claim 1, wherein identifying the tagged symbol by the sink terminal after the tagged symbol is received by the sink terminal comprises:
    acquiring the predefined patterns by the sink terminal; and
    comparing the predefined patterns with the tagged symbol received by the sink terminal for identifying the tagged symbol.

7. The method of claim 1, further comprising:
    using an 8$b$/10$b$ encoder for encoding a data stream to generate the plurality of symbols by the source terminal;
    wherein the link between the source terminal and the sink terminal corresponds to a high-speed media channel.

8. The method of claim 1, further comprising:
    transmitting an FEC disable sequence from the source terminal to the sink terminal;
    terminating the FEC encoder of the source terminal; and
    disabling an FEC decoder of the sink terminal to decode the at least one FEC block by the sink terminal after the FEC disable sequence is received by the sink terminal.

9. The method of claim 1, wherein the link between the source terminal and the sink terminal is a display Port (DP) link.

10. A forward error correction (FEC) synchronization system comprising:
    a source terminal comprising:
        an 8$b$/10$b$ encoder; and
        an FEC encoder coupled to the 8$b$/10$b$ encoder; and
    a sink terminal linked to the source terminal, the sink terminal comprising:
        a 10$b$/8$b$ decoder; and
        an FEC decoder coupled to the 10$b$/8$b$ decoder;
    wherein after a link between the source terminal and the sink terminal is established, the source terminal transmits an FEC enable sequence to the sink terminal after the FEC encoder of the source terminal is enabled, the source terminal periodically transmits a tagged symbol to the sink terminal, the sink terminal identifies the tagged symbol after the tagged symbol is received by the sink terminal, the sink terminal collects a plurality of symbols transmitted from the source terminal after the tagged symbol is successfully identified, the plurality of symbols constitute a plurality of FEC blocks received by the sink terminal, the sink terminal recovers synchronization of the plurality of FEC blocks between the source terminal and the sink terminal according to the tagged symbol when the FEC enable sequence is undetected by the sink terminal, and the tagged symbol comprises predefined patterns.

11. The system of claim 10, wherein the FEC decoder of the sink terminal decodes the plurality of FEC blocks after the plurality of FEC blocks are synchronized.

12. The system of claim 10, wherein each FEC block comprises N symbols, each symbol comprises M symbol bits, and a period of the tagged symbol is equal to P FEC blocks, N, M, and P are positive integers.

13. The system of claim 12, wherein the source terminal transmits the plurality of symbols to the sink terminal, and the sink terminal aligns the M symbol bits of the each symbol for synchronizing the plurality of symbols received by the sink terminal.

14. The system of claim 12, wherein the source terminal transmits the P FEC blocks to the sink terminal after the tagged symbol is transmitted from the source terminal to the sink terminal.

15. The system of claim 10, wherein the sink terminal acquires the predefined patterns, and the sink terminal compares the predefined patterns with the tagged symbol received by the sink terminal for identifying the tagged symbol.

16. The system of claim 10, wherein the source terminal uses the 8$b$/10$b$ encoder for encoding a data stream to generate the plurality of symbols, the sink terminal uses the 10$b$/8$b$ decoder for decoding the plurality of symbols to generate a decoded data stream, and the link between the source terminal and the sink terminal corresponds to a high-speed media channel.

17. The system of claim 10, wherein the source terminal transmits an FEC disable sequence to the sink terminal, the source terminal terminates the FEC encoder, and the sink terminal disables the FEC decoder to decode the at least one FEC block after the FEC disable sequence is received by the sink terminal.

18. The system of claim 10, wherein the link between the source terminal and the sink terminal is a display Port (DP) link.

\* \* \* \* \*